(12) United States Patent
Wendte et al.

(10) Patent No.: US 7,308,859 B2
(45) Date of Patent: Dec. 18, 2007

(54) SUSPENSION SYSTEM FOR PLANTING UNIT

(75) Inventors: Keith W. Wendte, Hinsdale, IL (US); Brian T. Adams, Centralia, MO (US)

(73) Assignee: CNH America LLC, Racine, WI (US)

( * ) Notice: Subject to any disclaimer, the term of this patent is extended or adjusted under 35 U.S.C. 154(b) by 215 days.

(21) Appl. No.: 10/979,525

(22) Filed: Nov. 2, 2004

(65) Prior Publication Data

US 2006/0090680 A1 May 4, 2006

(51) Int. Cl.
*A01C 5/00* (2006.01)
*A01C 13/00* (2006.01)

(52) U.S. Cl. ............... 111/164; 111/193; 111/194; 111/900

(58) Field of Classification Search ............... 111/149, 111/157, 163–169, 190–196, 200, 900
See application file for complete search history.

(56) References Cited

U.S. PATENT DOCUMENTS

| 4,448,259 | A | * | 5/1984 | Ford et al. | 172/462 |
| 5,727,638 | A | * | 3/1998 | Wodrich et al. | 172/414 |
| 6,321,667 | B1 | * | 11/2001 | Shoup | 111/137 |

* cited by examiner

*Primary Examiner*—Christopher J. Novosad
(74) *Attorney, Agent, or Firm*—Rebecca Henkel

(57) ABSTRACT

A planting unit is provided having a seed trench opener that forms a seed trench in a ground surface as the planting unit travels along the ground. A depth regulating member is provided that has a predetermined vertical position relative to the opener. The depth regulating member is operable to ride along the ground and thus predetermined the seed trench depth. A suspension assembly is provided to reduce the shock forces on the planting unit when obstacles are encountered. Furthermore, a suspension system is provided to the seed trench opener, in addition to the depth regulating member.

32 Claims, 7 Drawing Sheets

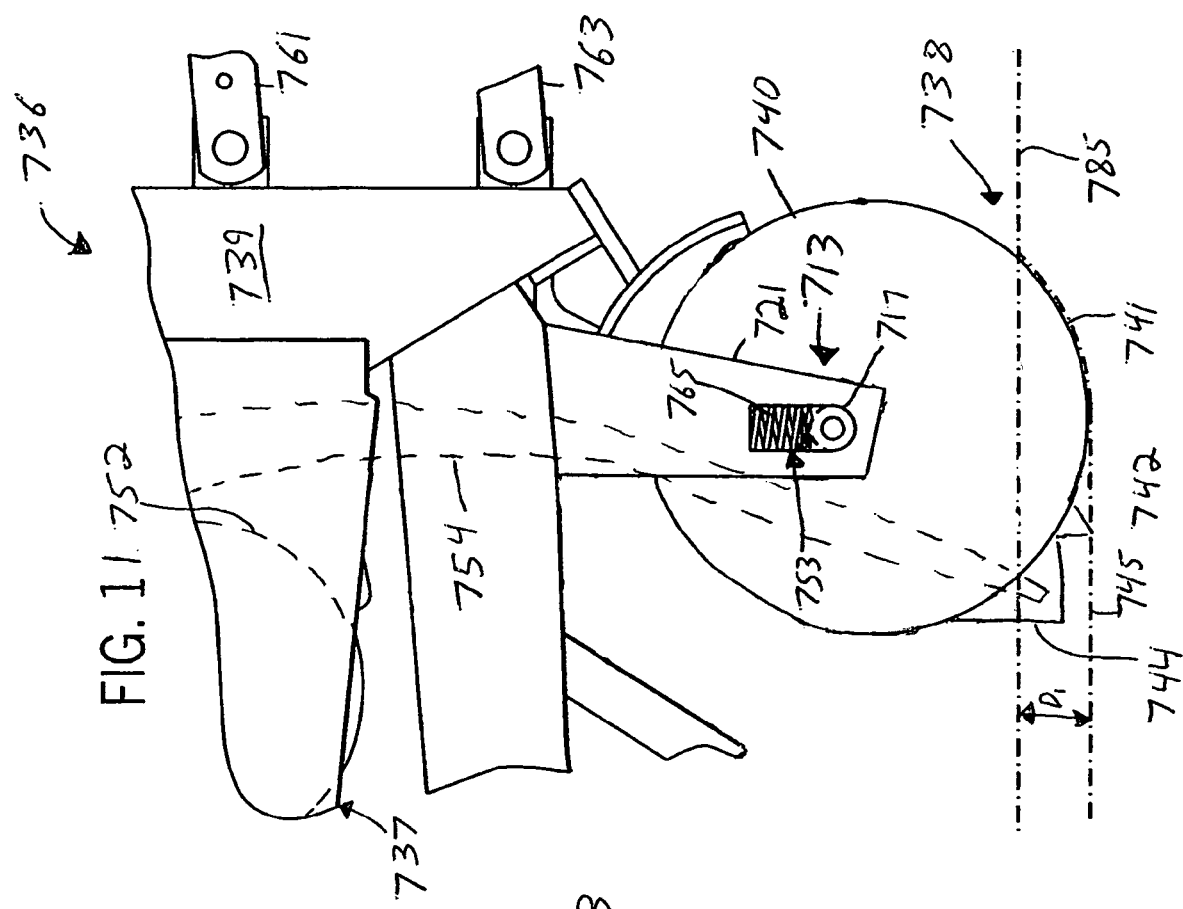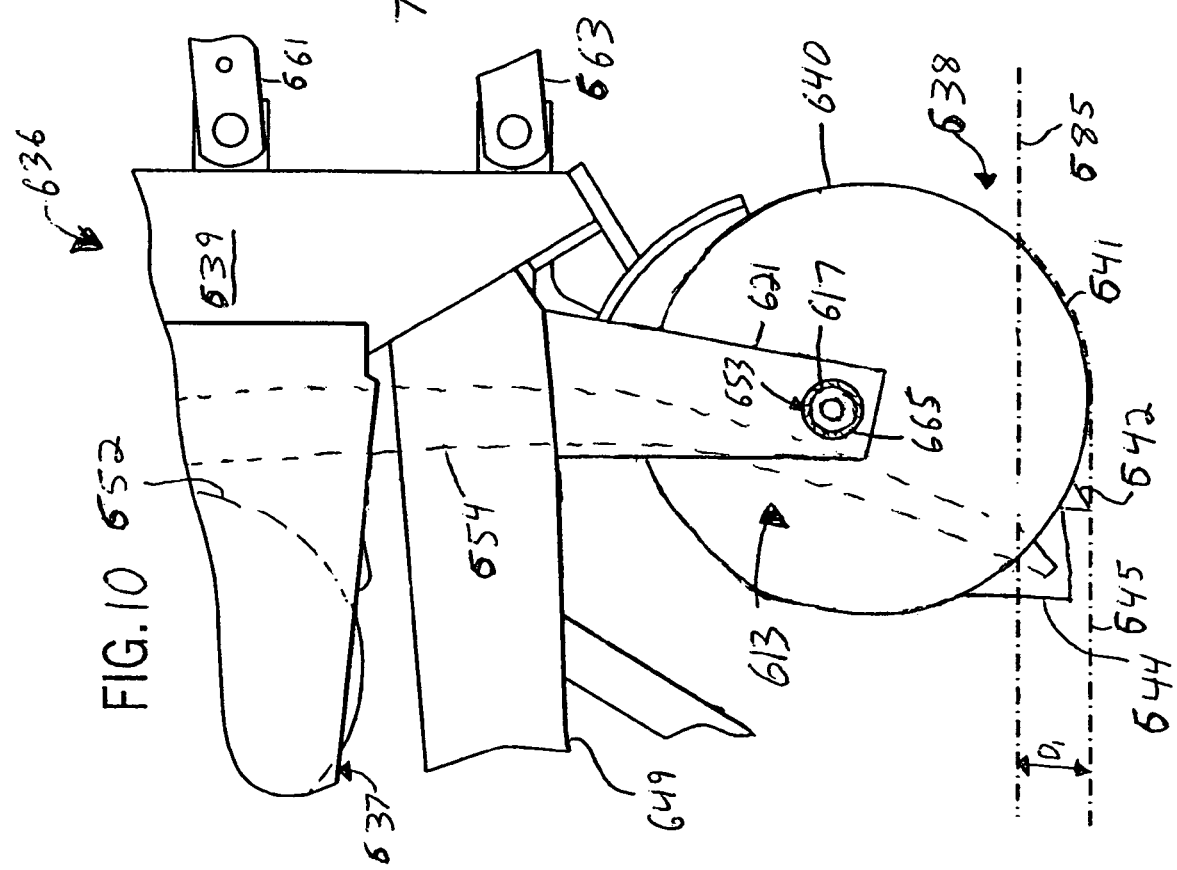

SUSPENSION SYSTEM FOR PLANTING UNIT

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

The present invention relates to seed planting assemblies in general, and in particular relates to a method and apparatus for maintaining seed trench consistency during seed planting operations.

A plurality of seed planting units (also known as row units) are typically supported on a laterally extending tool bar. The tool bar is typically coupled to a tractor or like vehicle suitable for towing the planting assembly along a field that is to be seeded to a crop. Each planting unit includes a device, such as one or more disks, for opening a seed trench in the ground as the tractor draws the tool bar across a field to be seeded. Each planting unit further includes a seed meter to dispense seeds at a controlled rate into a seed trench as the meter is advanced above and along the seed trench during operation. Generally, seeds are delivered to the metering assembly from a seed hopper located on the planting unit or, alternatively, from a smaller container fed from a centralized large hopper used to feed all or a portion of the planting units. Each planting unit further includes a closing assembly that moves soil at the sides of the seed trench to close the seed trench over the planted seeds. Adjacent planting units are laterally spaced a sufficient distance to form seed trenches that are spaced a corresponding distance apart that is suitable for the type of seed being planted.

It should be appreciated that a crop yield is maximized when all seeds emerge from the soil within a given timeframe relative to each other. Otherwise, if some seeds emerge later than others in a given row, the yield for that row can be substantially reduced. One known method for encouraging uniform seed emergence is to maintain the seed trench at a constant depth when performing seed planting operations. Seed trench depth is typically controlled by one or more gauge wheels that ride along the ground and have a predetermined vertical position relative to the seed trench opening device.

Unfortunately, numerous occurrences can cause the seed trench depth to decrease during a conventional planting operation. For instance, if one of the gauge wheels (or a single gauge wheel) encounters an object that projects above the soil surface (e.g., a rock, hard patch of soil, heavy residue covering the soil, etc . . . ), the planting unit is lifted out of the ground by the gauge wheel, thereby forcing the opener disk(s) out of the ground and producing an inconsistent seed trench depth. The corresponding vibration after the initial shock can also affect seed trench depth. Furthermore, the projecting object causes substantial acceleration forces to the planting unit that can cause metering accuracy degradation, and furthermore can create shock loads that degrade the row unit components.

Another difficulty is experienced when operating conventional planting units in hard compacted soils. Specifically, the opener disks typically create an upwards force that biases the planting unit out of the ground. This upwards force is greater in hard soil, and can overcome the weight of the planting unit. In these cases, therefore, the weight of the planting unit is insufficient for the purposes of keeping the gauge wheel(s) in contact with the soil surface, and the planting unit therefore may ride out of the ground, thereby decreasing the seed trench depth. This problem is conventionally addressed by providing springs or additional weight to add force to the planting unit which has the detrimental effect of causing a greater load to be supported by the opener disk(s). As a result, when the opener disk(s) encounters obstacles in the soil, a vibration or shock force is transmitted to the planting unit which, in turn, adversely affects the accuracy of seed trench depth metering, and further can cause damage to the disk opener assembly.

What is therefore needed is a more reliable method and apparatus for maintaining a consistent seed trench depth during operation while minimizing the adverse effects on the planting unit components.

SUMMARY OF THE INVENTION

In accordance with one aspect of the present invention, a seed planting assembly is provided including a laterally extending support member and a planting unit including a planting unit frame supported by the support member. The planting unit frame carries 1) a seed trench opening assembly operable to create a seed trench in a ground surface, 2) a seed delivery assembly that delivers seeds into the seed trench, 3) a seed trench closing assembly operable to close the seed trench, 4) a depth regulating assembly having a vertical position relative to the seed trench opening assembly, the depth regulating member being supported by an arm that is coupled to the planting unit frame, and 5) a shock absorbing member coupled to the arm that absorbs forces caused by obstructions encountered by the depth regulating member during a planting operation.

In accordance with another aspect of the invention, a seed planting assembly is provided and supported by a frame. The assembly includes a seed trench opening assembly operable to create a seed trench in a ground surface. A seed delivery assembly delivers seeds into the seed trench, and a seed trench closing assembly closes the seed trench. The seed trench closing assembly is supported by a first arm having a lower segment connected to the frame and an upper segment extending upwards therefrom. A depth regulating assembly has a vertical position relative to the seed trench opening assembly, and is supported by a second arm having a lower segment connected to the frame and an upper segment extending upwards therefrom. A shock absorbing member is connected between the upper segments of the first and second arms.

In accordance with yet another aspect of the invention, a method is provided for operating a planting unit including a planting unit frame supporting a seed trench opening assembly and a depth regulating member being supported by an arm that is coupled to the planting unit, wherein the depth regulating member has a vertical position relative to the seed trench opening assembly. The method includes coupling a shock absorbing member to the arm, wherein forces caused by obstructions encountered by the depth regulating member during a planting operation are absorbed by the shock absorbing member.

The foregoing and other aspects of the invention will appear from the following description. In the description, references are made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which:

FIG. 10 is a side elevation view of a seed trench opening assembly incorporating a shock absorbing assembly constructed in accordance with still another alternative embodiment of the present invention; and FIG. 11 is a side elevation view of a seed trench opening assembly similar to that illustrated in FIG. 10, but incorporating a shock absorbing assembly constructed in accordance with still another alternative embodiment of the present invention.

DETAILED DESCRIPTION OF THE PREFERRED EMBODIMENT

Figure 1:
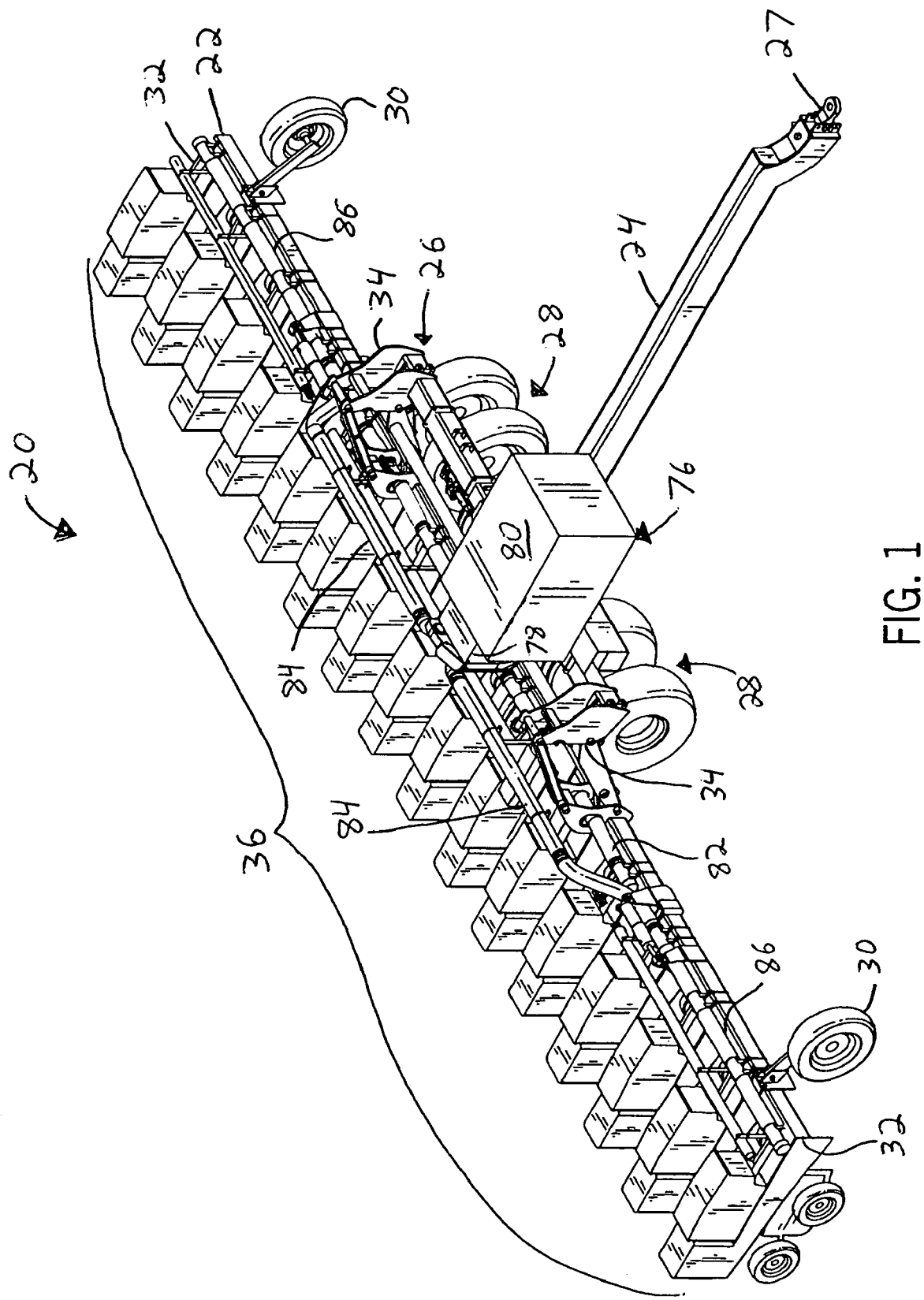
FIG. 1 is a schematic perspective view of a seed planting assembly supporting a plurality of seed planting units constructed in accordance with the preferred embodiment of the invention.

Referring to FIG. 1, a seed planting assembly 20 includes a laterally extending toolbar 22 connected at its middle to a forwardly extending tow bar 24. Tow bar 24 includes a connector 27 disposed at its longitudinally forward end and configured to mate with a corresponding hitch, or the like, of a towing tractor (not shown). Toolbar 22 is supported by a chassis 26 that is connected to tow bar 24 via a bracket assembly 34. Chassis 26 is supported on the ground by two pair of inner wheels 28 disposed on opposite sides of tow bar 24, and a pair of outer wheels 30 disposed proximal the opposing laterally outer ends 32 of toolbar 22.

A plurality of seed planting units (or row units) 36 extends longitudinally rearwards from toolbar 22. In particular, referring also to FIG. 2, each planting unit 36 includes a frame 37 that is connected at its front end 39 to toolbar 22 via a mounting assembly 59. Mounting assembly includes a pair of upper support beams 61 (one illustrated) and a pair of lower support beams 63 (one illustrated) that are hingedly connected to frame 37 at one end, and to a mounting structure 55 at another end. Mounting structure 55 is, in turn, connected to toolbar 22. Support beams 61 and 63 thus enable planting unit 36 to be raised and lowered without changing the orientation of the planting unit.

As is well-known in the art, planting units 36 are mounted in a side-by-side (lateral) relation relative to each other along the toolbar 22. While sixteen such row units are illustrated in FIG. 1, the present invention contemplates that a virtually unlimited number of row units can be assembled on a single toolbar 22 in accordance with the preferred embodiment. During operation, forward movement of the tractor causes row units 36 to ride along the ground, forming a plurality of seed trenches that receive seeds and are subsequently closed.

Figure 2:
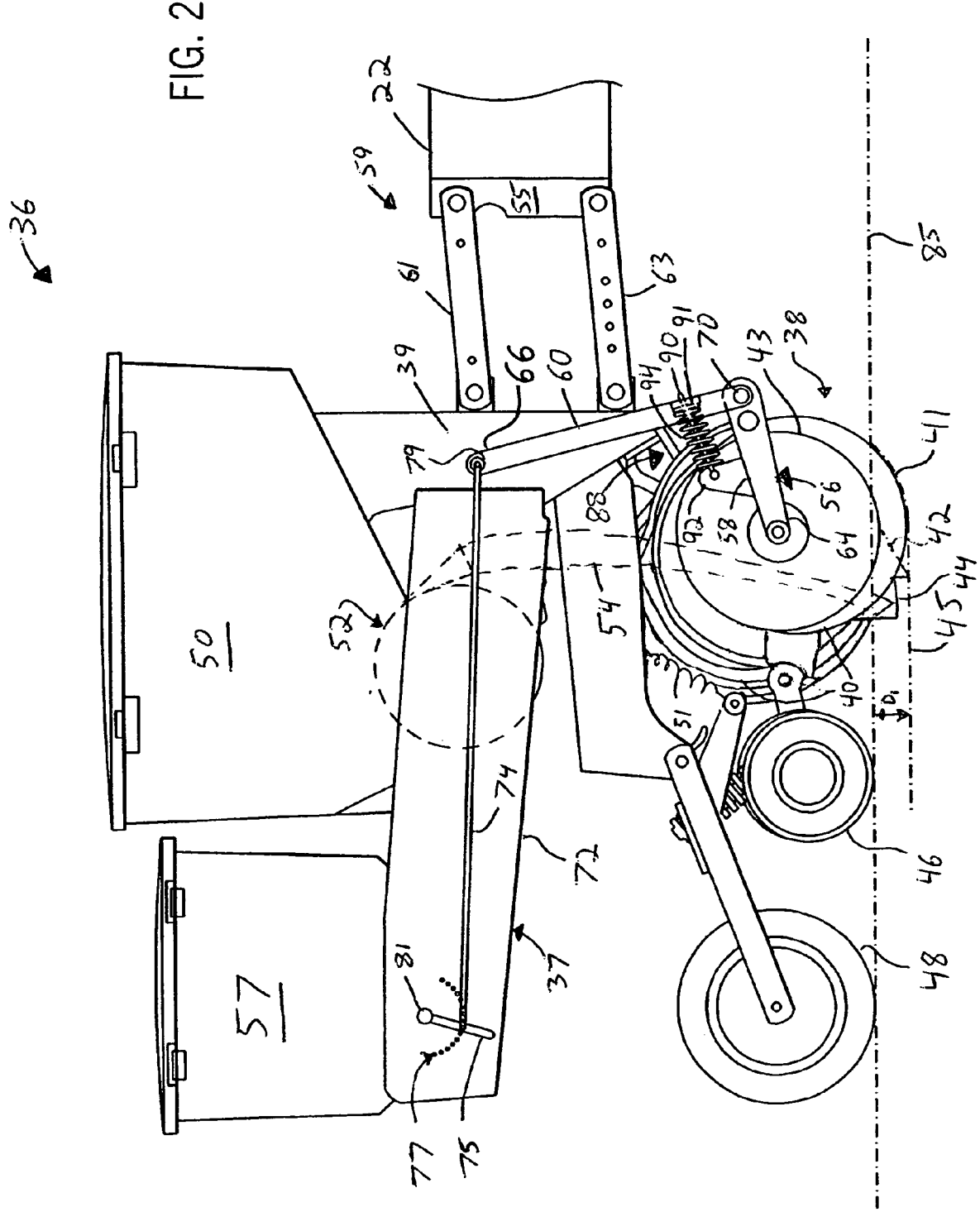
FIG. 2 is a side elevation view of a planting unit illustrated in FIG. 1 incorporating a shock absorbing assembly constructed in accordance with the preferred embodiment of the present invention.

Referring now to FIG. 2 in particular, each planting unit 36 includes a conventional seed trench opening assembly 38, each of which including a pair of laterally spaced seed trench opener discs 40 that converge forwardly and downwardly to define a convergence member 41 that creates a seed trench 45 as planting unit 36 is pulled along the ground 85. Seed trench 45 is preferably formed having a desired seed trench depth D1. A pair of gauge wheels 43 (one gauge wheel illustrated) is provided that are spaced laterally outward from either side of opener discs 40. Gauge wheels 43 are rotatably mounted on a corresponding gauge wheel arm 56, and are suspended independently of opener discs 40.

Each gauge wheel arm 56 includes a lower segment 58 having an outer end 64 that rotatably supports the corresponding gauge wheel 43. Gauge wheel arm 56 further includes an upper segment 60 defining an upper gauge wheel arm end 66. Upper segment 60 is pivotally connected to lower segment 58 at an elbow 70. Elbow 70 can further be pivotally mounted onto frame 37. In either case, lower segment 58 is coupled to planting unit frame 37, either directly or indirectly. Vertical translation of gauge wheels 43 relative to frame 37 causes the corresponding gauge wheel arm 56 to pivot about elbow 70, thereby causing the upper end 66 to translate forwards and rearwards.

Each planting unit 36 further includes a seed trench firming member 42 disposed rearward from convergence member 41. An opener shoe 44 is disposed rearward from firming member 42. Opener shoe 44 and firming member 42 can be integrally connected to each other. Firming member 42 extends slightly downwardly with respect to opener shoe 44, and helps define the seed trench formed by opening discs 40. Alternatively, the planting unit 36 can be provided with a runner opener type, or any alternative opener apparatus, suitable for providing a seed trench in the ground as is appreciated by one having ordinary skill in the art. Planting unit 36 further includes a pair of spring-loaded seed trench closer discs 46 disposed rearward from opener shoe 44. A press wheel 48 is disposed rearward from closer discs 46, and rotates as planting unit 36 travels along ground 85. Press wheel 48 is biased against the ground 85 by a spring 51.

Planting unit 36 further includes a seed hopper 50 that provides storage for seed material that is to be gravitationally deposited into the seed trench that is formed as the seed trench opening assembly moves across the field during operation. It should be appreciated, however, that a hopper container, smaller than container 50, can alternatively be connected to a centralized bin or large hopper in a conventional manner. In the illustrated embodiment, seeds are delivered from hopper 50 to a seed metering assembly 52 that acts under vacuum pressure to deliver the seeds into a seed tube 54 at a uniform rate. Seed tube 54 defines a conduit having an outlet end immediately downstream of opener shoe 44 and upstream of seed trench closer discs 46. Seed tube 54 thus receives seeds from metering assembly 52 and defines a substantially vertical passage through which the seeds are delivered into the seed trench, and preferably the trench formed by opener shoe 44. The components of seed metering assembly 52 are further described in U.S. Pat. No. 6,109,193, the disclosure of which is hereby incorporated by reference.

During operation, as the power source or tractor pulls the tool bar 22 across and over the ground, the seed trench opening assembly 38 opens a seed trench 45 in the ground. The depth of the seed trench is controlled by the relative vertical distance between the gauge wheels 43 and opener discs 40. Seeds from the hopper 50 flow into the seed metering assembly 52 in bulk and are subsequently deposited into the seed trench via seed delivery tube 54 at a controlled rate. The seed trench closer discs 46 trail the seed trench opening assembly 38 and, as the seed planting unit 36 is drawn across the field, close the seed trench together and over the seed dispensed by the seed metering assembly 52. The trailing press wheel 48 firms the soil closed over the delivered seeds.

Planting unit 36 can also be equipped with a pesticide hopper 57 that is mounted towards a rear end of the planting unit. Hopper 57 preferably includes an insecticide and/or herbicide and is provided with conventional dispensing apparatus for applying controlled amounts of insecticide where desired in combination with the planting of seeds by each planting unit 36.

Referring again to FIG. 1, each planting unit 36 can be coupled to an air moving system 76 that includes one or more air moving units (collectively identified as 78) enclosed in one or more housings (collectively identified as 80). While air mover unit(s) 78 are configured to provide negative pressure, they can alternatively function as blower units if a positive pressure seed metering assembly is implemented in planting units 36. Air moving system 76 includes a lower lateral tubing member 82 that is connected at its middle to one of the air moving units 78, and extends laterally outwardly therefrom in both directions. A plurality of openings (not shown) are formed in tubing member 82 that connect to a forward end of a corresponding plurality of flexible intake tubes that, in turn, connect with the corresponding metering assembly 52.

A bifurcated arrangement is illustrated with respect to a pair of upper lateral tubing members 84 that are connected at their laterally inner ends to one or more air mover units 78. Tubing members 84 extend parallel to, and are disposed above, tubing member 82, and are connected at their outer ends to outer tubing members 86. Outer tubing members 86 are vertically aligned with lower tubing member 82, and extend across those planting units 36 that are disposed laterally outwardly with respect to lower tubing member 82. A plurality of openings (not shown) are formed in tubing members 86 that connect to a plurality of flexible intake tubes that, in turn, connect with the metering assemblies 52 of laterally outwardly disposed planting units 36.

During operation, air moving units 78 draw air through the metering assemblies 52 of all planting units 36 to which the lateral tubes 82-86 are operably connected. The number of air mover units 78 implemented in a given seed planting assembly depends largely on the number of planting units 36 and the airflow rating of each air mover unit.

Referring again to FIG. 2, planting unit frame 37 includes a central longitudinally extending column 72 that houses a depth adjustment bar 74 extending generally along the entire length of column 72. Adjustment bar 74 can be manually set to define the vertical position of gauge wheels 43, and hence the depth $D_1$ of trench 45. Specifically, bar 74 is pivotally connected at its forward end to the upper end of segments 60 at corresponding joints 79 (one shown). As bar 74 translates forward, gauge wheel arms 56 are pivoted clockwise about elbow 70, and gauge wheels 43 are raised relative to opener discs 40, thereby setting a deeper desired depth $D_1$. Conversely, as bar 74 translates rearward, gauge wheel arm 56 is rotated counterclockwise, and gauge wheels 43 are lowered relative to opener discs 40, setting a shallower desired depth $D_1$. A lever 75 is pivotally connected to frame 37 at the rear end of column 72 via a joint 81, and is further connected to the rear end of bar 74. Lever 75 can thus be pivoted about joint 81 in a clockwise direction to decrease depth $D_1$, and in a counterclockwise direction to increase depth $D_1$ as desired. A number of apertures 77 extend through column 72, and receive a locking pin that fix lever 75 and, hence, the position of gauge wheels 43, in their desired position.

As described above, numerous occurrences, such as objects projecting above the soil surface, or instances of hard compacted soils, can cause the seed trench depth to unexpectedly decrease during conventional seed planting operations. In some cases, the corresponding vibration can also affect seed trench depth and cause metering accuracy degradation and create shock loads that degrade the row unit components.

A suspension system 88 is thus provided in accordance with one aspect of the invention, and is coupled to gauge wheels 43 and opener discs 40 to reduce the amount of vertical deflection and vibration experienced by planting unit 36. Suspension system 88 includes a pair of spring arms 90 (one illustrated) pivotally connected at one end to a flange 92 extending upwards from lower segment 58, and extends through upper segment 60 proximal elbow 70 at its opposite end. Arms 90 are therefore free to translate back and forth through upper segment 60 as gauge wheels 43 raise and lower (i.e., pivot clockwise and counterclockwise about elbow 70), however a stop 91 is provided to prevent arm 90 from traveling rearwards completely through segment 60.

Each spring arm 90 supports, and is surrounded by, a compression coil spring 94 that abuts flange 92 at one end and upper segment 60 at its opposite end. Spring 94 desirably have a spring constant within the range of 100 and 600 lbs/inch, and desirably about 250 lbs/inch, depending on the weight of planting unit, it being appreciated that springs having greater spring constants are typically associated with larger and heavier planting units. During operation, when planting unit 36 encounters an obstacle that applies an upward force tending to drive gauge wheels 43 up out of the ground, spring 94 1) provides a force that resists the clockwise pivoting of gauge wheel 43 about elbow 70, and 2) absorbs a majority of the shock forces received from the obstacle.

As a result, suspension system 88 advantageously absorbs a majority of the shock load that would otherwise be absorbed by opener discs 40 when planting unit 36 encounters a sharp obstacle. This also reduces the vibration experienced by column 72, which supports metering assembly 52 and seed tube 54. Suspension system 88 therefore further promotes accurate seed metering and placement, and further minimizes seed bounce within seed tube 54. Eliminating the vibration and shock loads experienced by planting unit 36 and the associated components promote a desired uniform seed spacing and seed depth.

It should be appreciated that the depth of furrow 45 can be affected by changes in the weight of planting unit 36 during operation due to, for example, seeds being depleted from, and added to, hopper 50, and furthermore due to changes in soil condition (e.g., conventional tillage vs. no-till soil). If one wishes to precisely control depth $D_1$ of furrow 45, an automatic down pressure unit could be integrated with planting unit as described in pending U.S. patent application Ser. No. 10/700,879 filed Nov. 4, 2003, the disclosure of which is hereby incorporated by reference as if set forth in its entirety herein.

Figure 3:
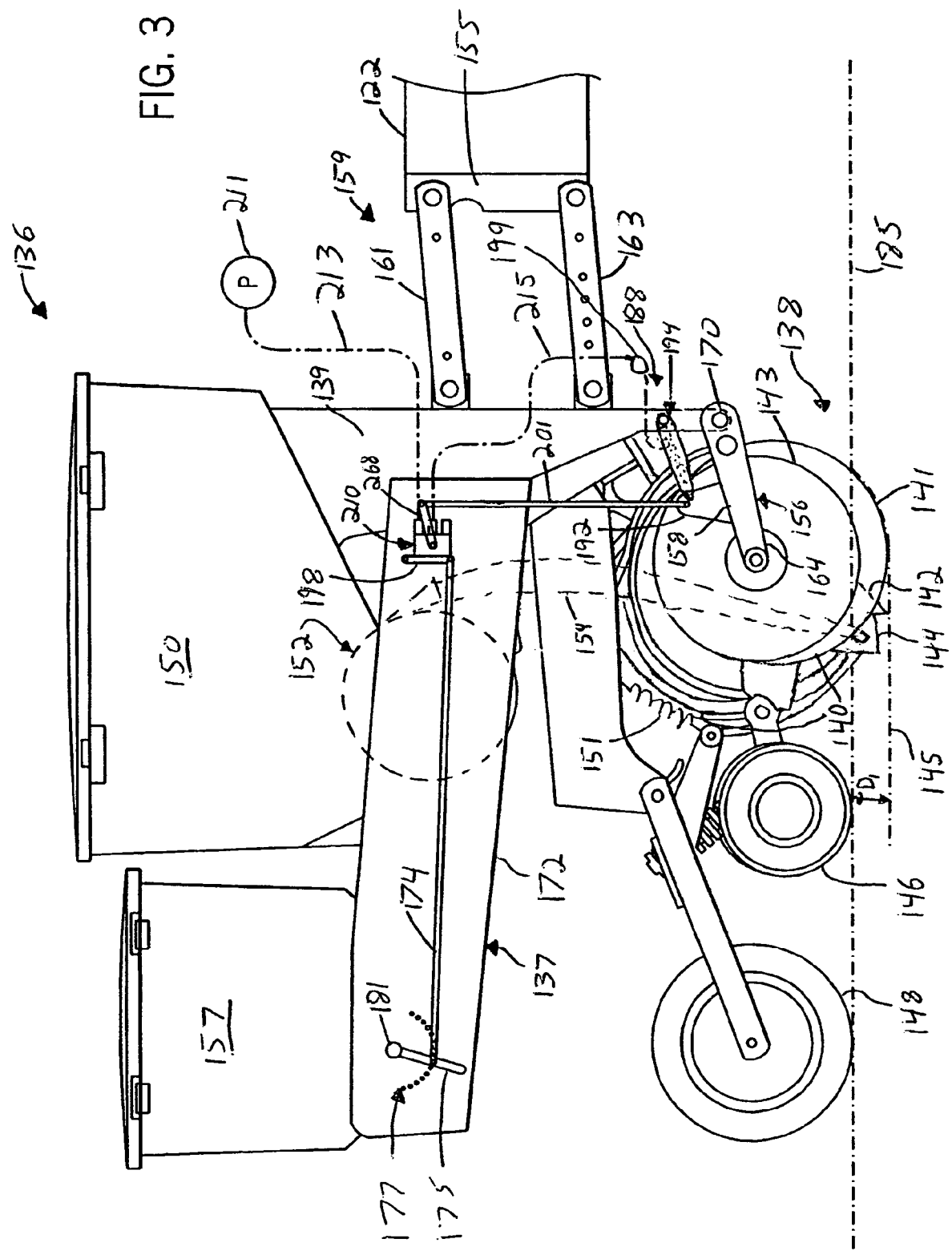
FIG. 3 is a side elevation view a planting unit similar to that illustrated in FIG. 2 but incorporating a shock absorbing assembly constructed in accordance with an alternative embodiment of the present invention.

One skilled in the art will appreciate that coil springs 94 could be replaced by any suitable member capable of applying the forces as described above. One such alternative will now be discussed with references to FIG. 3. Specifically, a planting unit 136 as illustrated in FIG. 3 having reference numerals of elements corresponding to those of FIG. 2 incremented by 100 for the purposes of clarity and convenience. The differences between planting units 36 and 136 will now be described.

Specifically, in FIG. 3, gauge wheel support arm 156 includes only lower segment 158 which is pivotally connected directly to front end 139 of frame 137 via joint 170. Suspension system 188 includes a gas-filled spring member 194 (preferably an air spring) connected to front end 139 at a location slightly above joint 170 at one end, and connected to flange 192 at its other end. Air spring 194 receives pneumatic pressure from an air leveling valve 210 that is supported by a bracket 198. Bracket 198 is pivotally mounted to column 172 at its upper end, and pivotally connected at its lower end to depth adjustment bar 174.

Valve 210 includes a lever 268 that is connected at its outer end to a gauge wheel sensing arm 201 that is further connected to flange 192. Accordingly, movement of gauge wheel 143 up and down causes sensing arm 201 to also move up and down, thereby causing lever 268 to pivot counterclockwise and clockwise, respectively. The construction and operation of valve 210 will now be described in more detail with further reference to FIGS. 4 and 5.

Specifically, valve 210 includes a valve housing 219 that is supported by bracket 198. Bracket 198, in turn, is pivotally mounted to column 172 at its upper end via a threaded locking pin 189, that extends laterally through the upper end of bracket 198, and corresponding nut. The lower end of bracket 198 is connected to a threaded pin 193 extending laterally outwards therefrom. Pin 193 is received by an opening 187 formed in the forward end of depth adjustment bar 174, and is secured by a corresponding nut. Lever 268 is pivotally connected at its outer end to sensing arm 201 via a bolt 183 and corresponding nut. Sensing arm 201 is positionable at one of several connection locations 171 on lever 268 to based on the desired sensitivity of valve 210. Lever 268 is further connected at its inner end to a keyed pin 173 that is secured by a corresponding nut. As a result, when lever 268 pivots with respect to housing, pin 173 correspondingly rotates to control airflow through valve 210.

Valve 210 includes a plurality of ports that are selectively engaged in response to rotation of pin 173. A first port 207 is connected via a conduit 213 to a compressed source 211 of gas (e.g., air) that can be, for example, a charged air reservoir in turn connected to an air compressor. Air source 211 is preferably centrally mounted onto tool bar 122, and provides forced air to one or more row units 136. Alternatively, air source 211 could be provided by the air braking system of the tractor (not shown) that tows planting assembly 20 during operation. A second port 209 is connected to air spring 194 via a conduit 215. A pressure relief valve 199 is disposed in conduit 215 and vents pressure from spring member 194 in the event that spring 194 becomes overpressurized. The present invention further contemplates that while source 211 preferably delivers pressurized air, it can alternatively provide any suitable fluid or media capable of inflating and deflating spring member 194, as appreciated by one having ordinary skill in the art. A third port 230 provides an outlet to the ambient environment.

Valve 210 is a variable flow valve, and can be of the type described in U.S. Pat. No. 4,726,571 and U.S. patent application Ser. No. 10/700,879 filed Nov. 4, 2003, the disclosure of each of which is hereby incorporated by reference as if set forth in its entirety herein. Alternatively, a skilled artisan will appreciate that valve 210 can be of any suitable construction capable of operating as described herein. In a first mode, when valve lever 268 is in a neutral, pivotally centered position, flow in and out of ports 207 and 209 is blocked. Accordingly, airflow is prevented from traveling from source 211 to spring 194, and air in spring 194 is prevented from flowing through valve 210 into the ambient environment via port 230.

Figure 4:
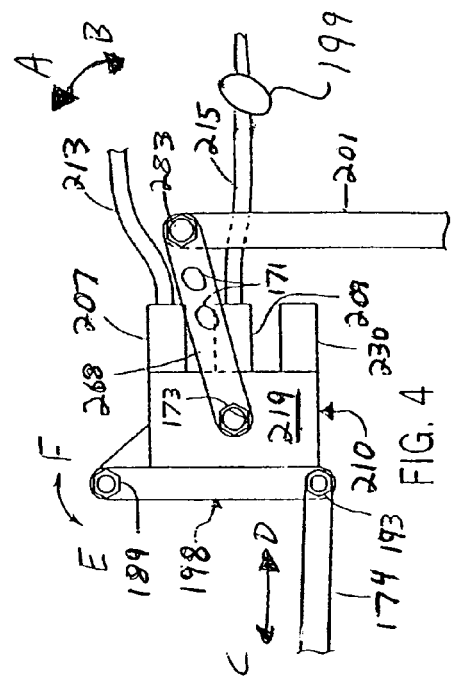
FIG. 4 is an enlarged view of the shock absorbing assembly illustrated in FIG. 3.
Figure 5:
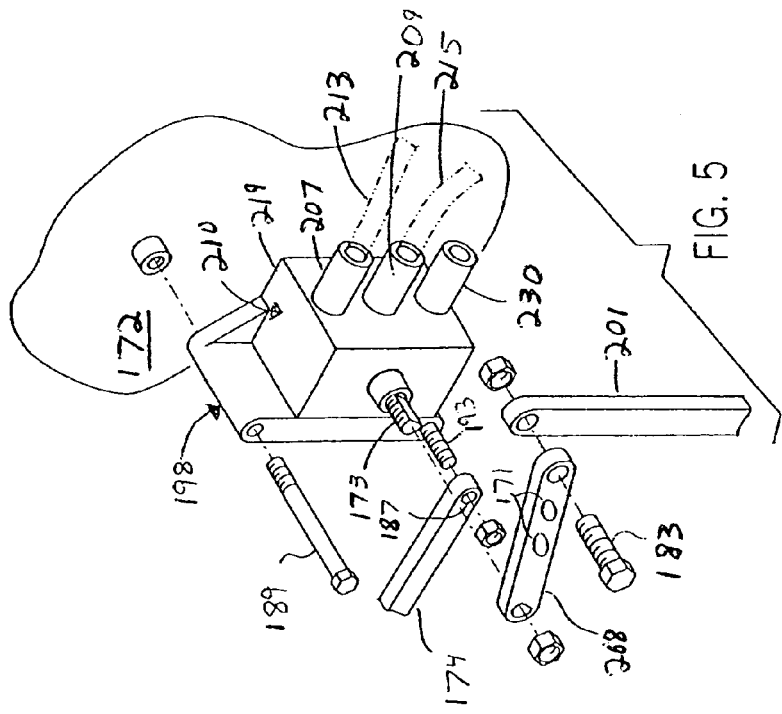
FIG. 5 is an exploded view of the shock absorbing assembly illustrated in FIG. 4.

In a second mode, when lever 268 is rotated clockwise in the direction of Arrow B of FIG. 4, port 207 is blocked, and port 209 is linked to port 215, thereby permitting air to flow from spring 194 into the ambient environment. It should be appreciated that removing air from spring 194 reduces the spring pressure, and correspondingly reduces the biasing force of spring 194 on flange 192, thereby decreasing the downward force on gauge wheel 143 until valve 210 assumes the above-described neutral position. Because valve 210 is a variable flow valve, the flow rate of air through the valve 210 from air spring 194 increases as lever 268 is pivoted increasingly clockwise. Conversely, subtle clockwise movements of lever 268 will cause a relatively slow airflow rate out of spring 194.

In a third mode, when lever 268 is rotated counterclockwise in the direction of Arrow A, port 230 is blocked, and port 207 is coupled to port 209, thus permitting air to flow from source 211 through valve 210 and into spring 194. It should be appreciated that increasing airflow into the spring 194 increases the spring pressure, and correspondingly biases spring 194 towards flange 192, increasing the downward force on gauge wheel 143. Because valve 210 is a variable flow valve, the flow rate of air traveling from source 211, through valve 210, and to spring 194 will increase as arm 268 is pivoted increasingly counterclockwise. Conversely, subtle counterclockwise movements of lever 268 will cause a relatively slow airflow rate into spring 194.

One can thus appreciate that valve 210 can be used to set the depth of gauge wheel 143 prior to operation, and can further be used to control the depth of gauge wheel 143 during operation.

Prior to a seed planting operation, if lever 175 is pivoted clockwise about joint 181, depth adjustment bar 174 is translated rearwards along the direction of Arrow C (FIG. 4), thereby causing bracket 198 to rotate in a clockwise direction (Arrow F in FIG. 4) with respect to column 172, and lever 268 will rotate in the counterclockwise direction about Arrow A with respect to valve housing 219. The counterclockwise rotation of lever 268 causes air to be added to spring 194, and depth $D_1$ of furrow 145 is decreased.

If lever 175 is pivoted counterclockwise about joint 181, depth adjustment bar 174 is translated forwards along the direction of Arrow D, thereby causing bracket 198 to rotate in a counterclockwise direction (indicated by Arrow E) with respect to column, and lever 268 will rotate in the clockwise direction about Arrow B with respect to valve housing 219. The clockwise rotation of lever 268 causes air to be removed from spring 194, and depth $D_1$ of furrow 145 is increased.

During a seed planting operation, as described above, it is desirable to maintain the down pressure acting against gauge wheel 143 against frame 137 at the predetermined desired level that produces a consistent seed trench 145 depth $D_1$. The desired trench depth $D_1$ is achieved by providing a down pressure against gauge wheels 143 that is sufficient to ensure that the wheels ride along the ground, thus properly gauging the trench depth, without compacting adjacent soil.

However, when planting unit 136 travels into softer terrain or when the planting unit travel speed is decreased, the existing down pressure will be excessive, thus causing opener discs 140 to sink farther into the ground relative to the gauge wheels 143. The resulting trench 145 thus has a depth that is greater than the desired depth $D_1$. Because the upward vertical forces that the ground 185 imparts on the opener discs 140 decreases during such conditions, the upward forces acting on the gauge wheels 143 will increase and cause sensing arm 201 to raise and pivot lever 268 in a counterclockwise direction about valve housing 219. As described above, counterclockwise rotation of lever 268 causes air to be added to spring 194. As the air is added to spring 194, opener discs 140 begin to rise within the ground 185, causing a reduction in the air flowing out of the spring 194. Once the discs 140 rise to a position such that seed trench 145 reaches desired depth $D_1$, the lever 268 will be in the neutral position, and the down pressure will be maintained.

On the other hand, when planting unit 136 travels over hard terrain, or travels at faster speeds, opener discs 140 will tend to rise within the ground, thereby causing the planting unit 136 to rise as well. The gauge wheels 136 are forced to carry too much load in this situation, and the trench depth is thus less than the desired depth $D_1$. As a result, it is desired to allow the gauge wheels to carry less load to ensure proper trench depth. When this situation occurs, gauge wheel arm 156 lowers relative to planting unit frame 137, thereby causing lever 268 to pivot in a clockwise direction about valve housing 219. As described above, air is allowed to escape from air spring 194, thereby allowing more of the load to be transferred from gauge wheels 143 to the opener discs 140. Opener discs 140 will be forced further into the ground, thereby increasing the depth of seed trench 145. Air flow to and from spring 194 will be blocked once the desired down pressure is achieved, at which point the valve arm 268 will be in the neutral position.

Figure 6:
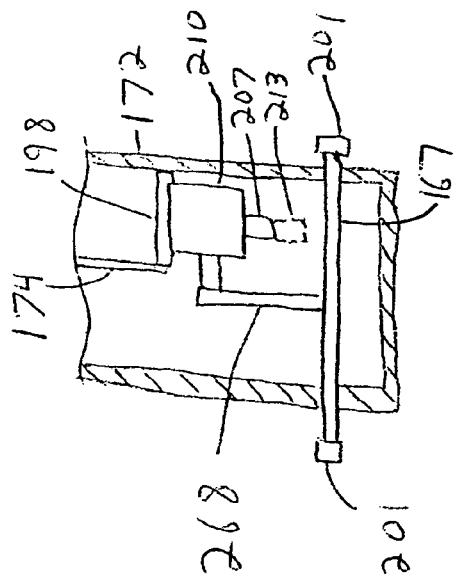
FIG. 6 is a partial top plan view of the shock absorbing assembly illustrated in FIG. 3.

Referring now to FIG. 6, each gauge wheel 143 is provided with a dedicated air spring 194 that is connected to a sensing arm 201 as described above. A linkage 167 is connected to the upper ends of sensing arms 201, and is pivotable about a longitudinal axis. As a result, the midpoint of linkage 167 is at a height of the average between heights of the upper ends of sensing arms 201. The midpoint of linkage is connected to the outer end of lever 268. As a result, valve 210 responds to the average position of gauge wheels 143 in order to control the depth of seed trench 145.

It should be appreciated that the planting unit 136 advantageously enables a user to perform planting operations at various speeds and over various terrain while maintaining a constant desired seed trench depth without having to manually adjust the down pressure on the planting unit.

As a further advantage, air spring 194 provides a force that resists the clockwise pivoting of gauge wheel 143 about elbow 170 in response to an obstacle. As a result, suspension system 170 illustrated in FIG. 3 advantageously absorbs a majority of the shock load that would otherwise be absorbed by gauge wheels 143 when planting unit 136 encounters a sharp obstacle. This also reduces the vibration experienced by column 172, which supports metering assembly 152 and seed tube 154. Suspension system 188 therefore further promotes accurate seed metering and placement, and further minimizes seed bounce within seed tube 154. Eliminating the vibration and shock loads experienced by planting unit 136 and the associated components promote a desired uniform seed spacing and seed depth.

Figure 8:
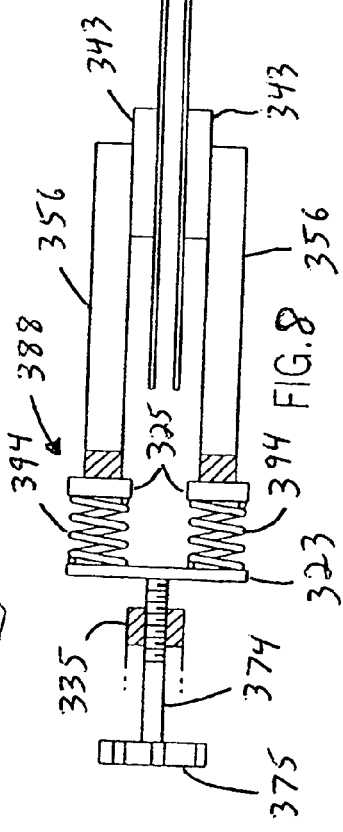
FIG. 8 is a sectional elevation view of the planting unit illustrated in FIG. 7 taken along line 8-8.
Figure 7:
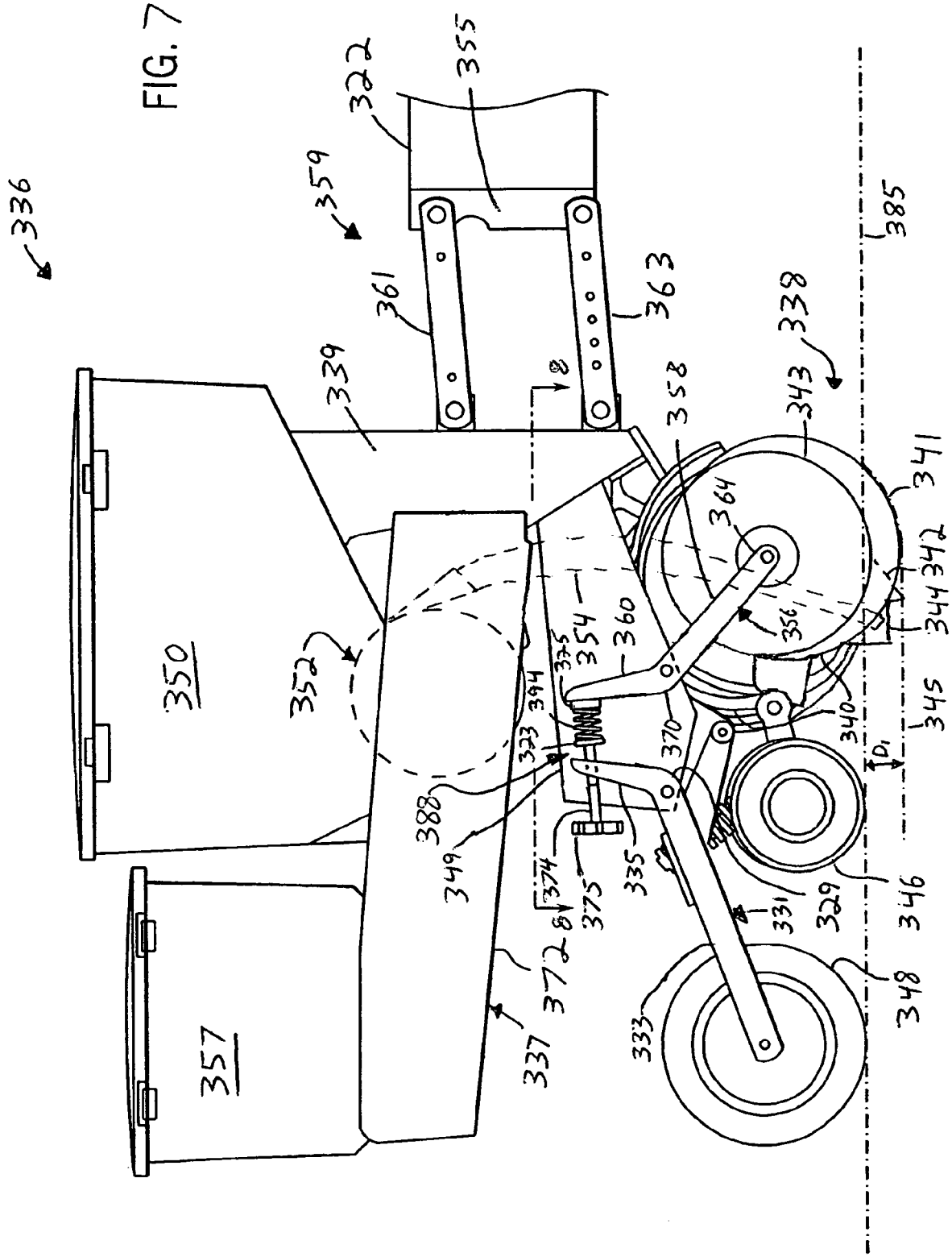
FIG. 7 is a side elevation view a planting unit similar to that illustrated in FIG. 2 but incorporating a tandem gauge wheel configuration and a shock absorbing assembly constructed in accordance with another alternative embodiment of the present invention.

Referring now to FIGS. 7 and 8, a planting unit 136 as illustrated in accordance with an alternative embodiment having reference numerals corresponding to elements of FIG. 2 incremented by 300 for the purposes of clarity and convenience. As illustrated in FIG. 7, each gauge wheel 343 is supported by a gauge wheel arm 356 including a lower segment 358 that extends upwards and rearward from the hub of the corresponding gauge wheel. A substantially vertical upper segment 360 is integrally connected to lower segment 358 via a fixed elbow 370. Accordingly, lower segment 358 is rigid with respect to upper segment 360. Elbow 370 can be pivotally mounted to chassis 349.

Press wheel 348, which can be a single wheel or a pair of pinch wheels as generally understood in the art, is connected to chassis 349 via a press wheel arm 331 including a lower segment 333 that extends upwards and forwards from the hub of press wheel 348, and is connected to a substantially vertical upper segment 335 via a fixed elbow 329. Accordingly, lower segment 333 is rigid with respect to upper segment 335. Elbow 329 is pivotally connected to chassis 349 at a location rearwards from elbow 370.

A depth adjustment bar 374 is threaded through upper segment 335, and terminates at a substantially flat laterally extending plate 323 that spans a distance corresponding to the distance between adjacent engagement surfaces 325 connected to each upper segment 360. A suspension system 388 is provided in the form of a compression coil spring 394 that is coupled to upper segment 360 of arm 356, and specifically is connected between engagement surfaces plate 323 and engagement surfaces 325. Planting unit 336 thus provides independent suspension for each gauge wheel arm 356 while, at the same time, facilitating consistent trench depth adjustment for each gauge wheel 343 as will now be described.

In particular, prior to a planting operation, a user rotates a depth adjustment knob 375 that is connected to the rear end of depth adjustment bar 374 to set the desired trench depth $D_1$. Specifically, clockwise rotation of knob 375 (with respect to a forward-looking direction), will cause plate 323 to translate forward and, accordingly gauge wheel arms 356 to simultaneously pivot clockwise about elbow 370. Gauge wheels 343 will thus be lowered, thereby decreasing depth $D_1$. Conversely, if knob 375 is rotated counterclockwise, gauge wheels 343 will be raised and depth $D_1$ will increase.

During a planting operation, when a gauge wheel 343 encounters an obstacle that applies an upward force tending to drive the gauge wheel 343 up out of the ground, spring 394 1) provides a force that resists the counterclockwise pivoting of gauge wheel 343 about elbow 370, and 2) absorbs a majority of the shock forces received from the obstacle.

As a result, suspension system 388 advantageously absorbs a majority of the shock load that would otherwise be absorbed by opener discs 340 when planting unit 336 encounters a sharp obstacle. This also reduces the vibration experienced by chassis 349 and column 372, which support metering assembly 352 and seed tube 354. Suspension system 388 therefore further promotes accurate seed metering and placement, and further minimizes seed bounce within seed tube 354. Eliminating the vibration and shock loads experienced by planting unit 336 and the associated components promote a desired uniform seed spacing and seed depth.

If planting unit 336 alternatively included two press wheels 348, the upper end of each press wheel arm 331 would be connected to a spring that is further connected to a spanner plate similar in the manner illustrated with respect to gauge wheels 343. Threaded bar 374 would thus extend through the plate connecting press wheel arms 331, and each press wheel 348 would be independently suspended as described above with respect to gauge wheels 343.

Because gauge wheel 343 and press wheel(s) 348 are connected in tandem, an upward force on gauge wheels 343, such as the type caused by a momentary obstacle, would cause a downward force on press wheel(s). Chassis 349 would thus only be raised less than one-half the height of the obstacle encountered by the gauge wheel, as described in pending U.S. patent application Ser. No. 10/759,309 filed Jan. 16, 2004, the disclosure of which is hereby incorporated by reference.

Figure 9:
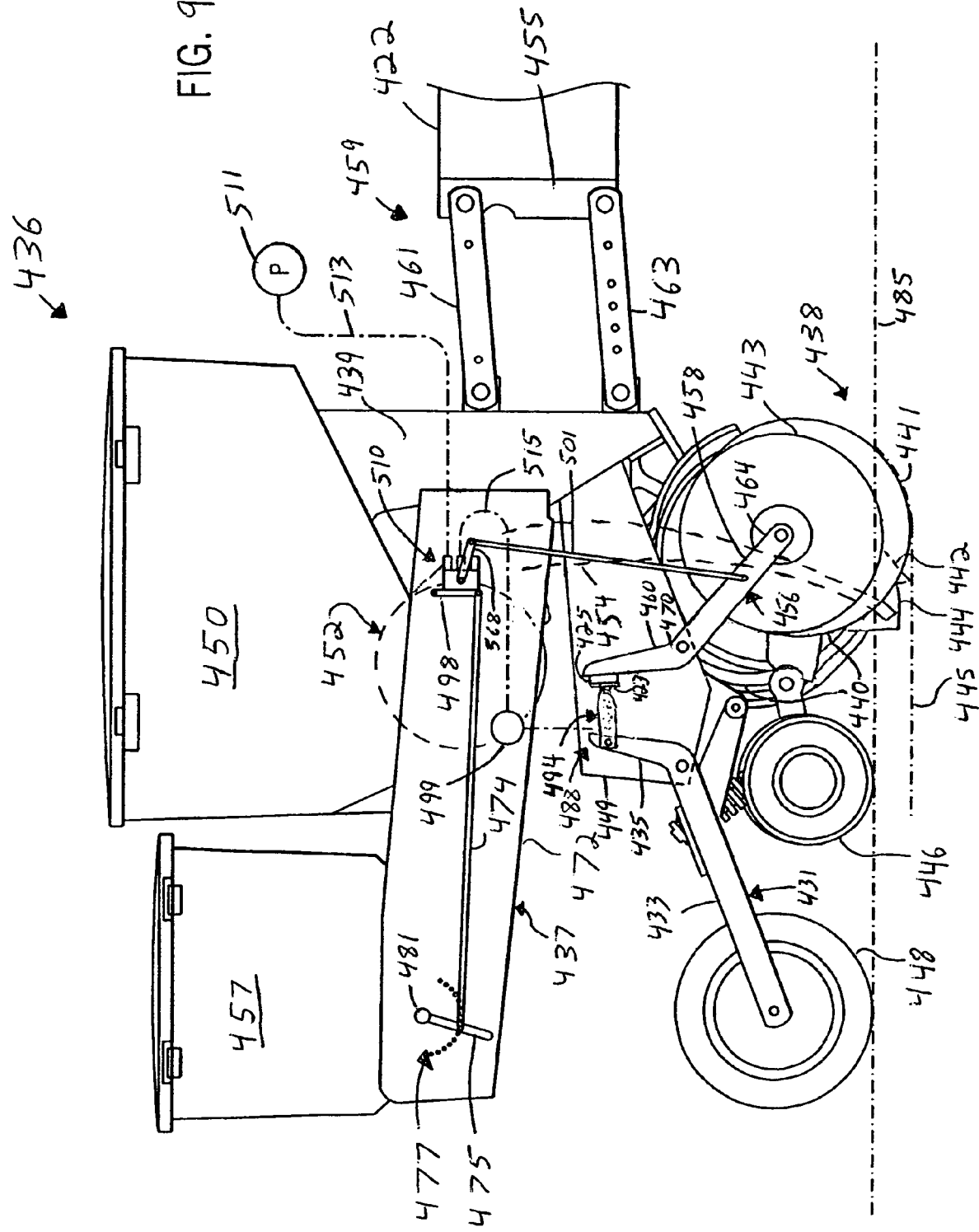
FIG. 9 is a side elevation view of a planting unit similar to that illustrated in FIG. 3, but incorporating a tandem gauge wheel configuration and a shock absorbing assembly constructed in accordance with yet another alternative embodiment of the present invention.

Referring now to FIG. 9, a planting unit 436 is illustrated in accordance with an alternative embodiment of the invention. Planting unit 436 connects press wheel(s) 448 and gauge wheels 443 in tandem as described above with reference to FIG. 7 via an air spring 494 and valve 510 as described above with reference to FIG. 3. Accordingly, the reference numerals in FIG. 9 corresponding to like elements of FIG. 3 have been incremented by 300, and reference numerals corresponding to like elements of FIG. 7 have been incremented by 100 for the purposes of clarity and convenience.

Specifically, engagement surfaces 425 are linked by a laterally extending plate 423. An air spring 494 of the type described above is connected between upper end 435 of press wheel support arm 431 and the midpoint of plate 423. Air spring 494 receives pressure from a source 511 via a valve 510 that is pivotally supported by column 472 via a bracket 498. Gauge wheels 443 are connected arms 501 that are, in turn, connected to each other by a linkage connected at its midpoint to the outer end of valve lever 568. The lower end of bracket 498 is connected to depth adjustment bar 474 for the purposes of setting the desired trench depth $D_1$ prior to a planting operation as described above with reference to FIG. 3. Because gauge wheels 443 and press wheel(s) 448 are connected in tandem, chassis 449 is raised only a fraction of the height of an obstacle that is encountered, as described above with reference to FIG. 7.

Referring again to FIG. 9, during operation, when planting unit 436 travels into softer terrain or when the planting unit travel speed is decreased, the existing down pressure will be excessive, thus causing opener discs 440 to sink into the ground 485 relative to the gauge wheels 443. The resulting trench depth thus has a depth that is greater than $D_1$. Because the upward vertical forces that the ground 485 imparts on the opener discs 440 decreases during such conditions, the upward forces acting on the gauge wheels 443 will increase and cause sensing arm(s) 501 to raise and pivot lever 568 in a counterclockwise direction about the valve housing 219. As described above, counterclockwise rotation of lever 568 causes air to be added to spring 494. As air is added to spring 494, opener discs 440 begin to rise within the ground 485, causing a reduction in the air flowing out of the spring 494. Once the discs 440 rise to a position such that seed trench 445 reaches desired depth $D_1$, the lever 568 will be in the neutral position, and the down pressure will be maintained.

On the other hand, when planting unit 436 travels over hard terrain, or travels at faster speeds, opener discs 440 will tend to rise within the ground, thereby causing the planting unit 436 to rise as well. The gauge wheels 443 are forced to carry too much load in this situation, and the trench depth is thus less than the desired depth $D_1$. As a result, it is desired to allow the gauge wheels to carry less load to ensure proper trench depth. When this situation occurs, the gauge wheel arm 456 lowers relative to planting unit frame 437, thereby causing lever 568 to pivot in a clockwise direction about valve housing 519. As described above, air is allowed to escape from air spring 494 in this situation, thereby allowing more of the load to be transferred from gauge wheel 443 to the opener discs 440. Opener discs 440 will be forced further into the ground, thereby increasing the depth of seed trench 445. Air flow to and from spring 494 will be blocked once the desired down pressure is achieved, at which point the valve arm 568 will be in the neutral position.

It should be appreciated that the planting unit 436 advantageously enables a user to perform planting operations at various speeds and over various terrain while maintaining a constant desired seed trench depth without having to manually adjust the down pressure on the planting unit.

As a further advantage, air spring 494 provides a force that resists the counterclockwise pivoting of gauge wheel 443 about elbow 470 in response to an obstacle. As a result, suspension system 488 advantageously absorbs a majority of the shock load that would otherwise be absorbed by gauge wheels 443 when planting unit 436 encounters a sharp obstacle. This also reduces the vibration experienced by column 472 and chassis 449, which supports metering assembly 452 and seed tube 454. Suspension system 488 therefore further promotes accurate seed metering and placement, and further minimizes seed bounce within seed tube 454. Eliminating the vibration and shock loads experienced by planting unit 436 and the associated components promote a desired uniform seed spacing and seed depth.

Referring now to FIG. 10, a portion of a planting unit 636 is illustrated having reference numerals corresponding to like elements of FIG. 2 incremented by 600 for the purposes of clarity and convenience. Planting unit 636 can, if desired, include a shock absorbing system constructed in accordance with any of the embodiments described above and their equivalents, and further mounts each opener disc 640 via a shock absorbing mounting assembly 613.

An opener disc support leg 621 extends down from chassis 649 and defines an aperture 653 at its lower end. A bearing 617 is supported both by aperture 653 and the hub of opener disc 640 to facilitates rotation of disc 640 during operation. A ring 665 of a resilient or malleable material, such as rubber, surrounds bearing 617 in aperture 653, and occupies the space between the outer surface of bearing 617 and the inner surface of aperture 653. Ring 665 absorbs shock loads and vibrations that occur when opener disc 640 encounters obstacles such as rocks or other foreign objects during a seed planting operation. The shock absorption protects the planting unit components and provides a cushion for planting unit 736, thereby promoting uniform seed spacing and depth control.

Referring now to FIG. 11, a portion of a planting unit 736 is illustrated in accordance with an alternative embodiment having reference numerals corresponding to like elements of FIG. 10 incremented by 100 for the purposes of clarity and convenience. Planting unit 736 can, if desired, include a shock absorbing system constructed in accordance with any of the embodiments described above and their equivalents, and further mounts each opener disc 740 via a shock absorbing mounting assembly 713.

Specifically, an opener disc support leg 721 extends down from chassis 749 and defines a vertically elongated slot 753. A bearing 717 is supported both by the lower end of slot 753 and by the hub of opener disc 740 to facilitates rotation of disc 740 during operation. A compression coil spring 765 is disposed in slot 753, and extends between the upper end of the slot and bearing 717. Spring 765 absorbs shock loads and vibrations that occur when opener disc 740 encounters obstacles such as rocks or other foreign objects during a seed planting operation. The shock absorption protects the planting unit components and provides a cushion for planting unit 736, thereby promoting uniform seed spacing and depth control.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A seed planting assembly comprising:
   a laterally extending support member;
   a planting unit including a planting unit frame supported by the support member, wherein the planting unit frame carries:
   i. a seed trench opening assembly operable to create a seed trench in a ground surface;
   ii. a seed delivery assembly delivering seeds into the seed trench;
   iii. a seed trench closing assembly operable to close the seed trench; and
   iv. a depth regulating member having a vertical position relative to the seed trench opening assembly, the depth regulating member being supported by an arm that is coupled to the planting unit frame; and
   v. a shock absorbing member coupled to the arm indepedent of the seed trench opening assembly that absorbs forces caused by obstructions encountered by the depth regulating member during a planting operation.

2. The seed planting assembly as recited in claim 1, wherein the arm comprises a lower segment coupled to an upper segment, wherein the shock absorbing member is connected between the lower and upper segments.

3. The seed planting assembly as recited in claim 2, wherein the shock absorbing member comprises a compression coil spring.

4. The seed planting assembly as recited in claim 2, wherein the shock absorbing member comprises a gas-filled spring.

5. The seed planting assembly as recited in claim 4, further comprising a valve connected to the depth regulating member via an arm moves in response to depth regulating member movement and actuates the valve to introduced a gas into, and remove gas from, the spring as the depth regulating member varies in height during the planting operation.

6. The seed planting assembly as recited in claim 5, further comprising a depth adjustment assembly including an arm connected to the upper segment, wherein translation of the arm causes the depth regulating member to translate vertically.

7. The seed planting assembly as recited in claim 6, wherein the valve is pivotally mounted to the frame.

8. The seed planting assembly as recited in claim 5, wherein the depth regulating assembly further comprises a pair of depth regulating members, each member being supported by the frame via an arm including a lower segment coupled pivotally connected to an upper segment.

9. The seed planting assembly as recited in claim 6, wherein the upper segments are joined by an arm that is, in turn, coupled to the valve.

10. The seed planting assembly as recited in claim 2, wherein the upper and lower segments are pivotally connected at an elbow that is connected to the frame.

11. The seed planting assembly as recited in claim 1, wherein the depth regulating member support arm comprises a first lower segment connected to a first upper segment, and wherein the seed trench closing assembly is disposed behind the depth regulating member and is supported by the frame via a closing assembly support arm having a second lower segment and a second upper segment.

12. The seed planting assembly as recited in claim 11, wherein the shock absorbing member extends between the first and second upper segments.

13. The seed planting assembly as recited in claim 12, wherein the shock absorbing member comprises a coil spring.

14. The seed planting assembly as recited in claim 12, wherein the shock absorbing member comprises a gas-filled spring.

15. The seed planting assembly as recited in claim 14, further comprising a valve connected to the depth regulating member via an arm that causes a gas to be introduced into, and removed from, the spring as the depth regulating member varies in height during the planting operation.

16. The seed planting assembly as recited in claim 1, wherein the seed trench opening assembly is supported by the frame via a resilient member.

17. A method for operating a planting unit including a planting unit frame supporting a seed trench opening assembly and a depth regulating member being supported by an arm that is coupled to the planting unit, wherein the depth regulating member has a vertical position relative to the seed trench opening assembly, the method comprising the step of:
   coupling a shock absorbing member to the arm independent of the seed trench opening assembly, wherein forces caused by obstructions encountered by the depth regulating member during a planting operation are absorbed by the shock absorbing member.

18. The method as recited in claim 17, further comprising coupling the shock absorbing member between a lower segment and upper segment of the arm.

19. The method as recited in claim 18, wherein the shock absorbing member comprises a compression coil spring.

20. The method as recited in claim 18, wherein the shock absorbing member comprises a gas-filled spring.

21. The method as recited in claim 20, further comprising connecting a valve to the depth regulating member via an arm moves in response to depth regulating member movement and actuates the valve to introduced a gas into, and remove gas from, the spring as the depth regulating member varies in height during the planting operation.

22. The method as recited in claim 21, wherein the planting unit further comprises a depth adjustment assembly including an arm connected to the upper segment, the method further comprising the step of translating the depth member vertically in response to translation of the arm.

23. The method as recited in claim 22, further comprising the step of pivotally mounting the valve to the frame.

24. The method as recited in claim 21, wherein the depth regulating assembly further comprises a pair of depth regulating members, the method further comprising the step of supporting each member on the frame via an arm including a lower segment coupled pivotally connected to an upper segment.

25. The method as recited in claim 22, further comprising the step of joining the upper segments by an arm that is, in turn, coupled to the valve.

26. The method as recited in claim 18, further comprising the step of pivotally connecting the upper and lower segments at an elbow that is coupled to the frame.

27. The method as recited in claim 17, wherein the depth regulating member support arm comprises a first lower segment connected to a first upper segment, and wherein the seed trench closing assembly is disposed behind the depth regulating member and is supported by the frame via a closing assembly support arm having a second lower segment and a second upper segment.

28. The method as recited in claim 27, wherein the shock absorbing member extends between the first and second upper segments.

29. The method as recited in claim 28, wherein the shock absorbing member comprises a coil spring.

30. The method as recited in claim 28, wherein the shock absorbing member comprises a gas-filled spring.

31. The method as recited in claim 30, further comprising the step of connecting a valve to the depth regulating member via an arm that causes a gas to be introduced into, and removed from, the spring as the depth regulating member varies in height during the planting operation.

32. The method as recited in claim 17, wherein the seed trench opening assembly is supported by the frame via a resilient member.

* * * * *